(12) United States Patent
Vainio et al.

(10) Patent No.: US 6,993,488 B2
(45) Date of Patent: Jan. 31, 2006

(54) AUDIBLE ERROR DETECTOR AND CONTROLLER UTILIZING CHANNEL QUALITY DATA AND ITERATIVE SYNTHESIS

(75) Inventors: Janne Vainio, Lempaala (FI); Hannu J. Mikkola, Tampere (FI); Jani Rotola-Pukkila, Tampere (FI)

(73) Assignee: Nokia Corporation, Espoo (FI)

( * ) Notice: Subject to any disclaimer, the term of this patent is extended or adjusted under 35 U.S.C. 154(b) by 906 days.

(21) Appl. No.: 09/852,127

(22) Filed: May 9, 2001

(65) Prior Publication Data

US 2002/0002456 A1    Jan. 3, 2002

Related U.S. Application Data

(60) Provisional application No. 60/209,860, filed on Jun. 7, 2000.

(51) Int. Cl.
*G10L 19/00*     (2006.01)

(52) U.S. Cl. .................. 704/500; 704/200; 714/52
(58) Field of Classification Search ............... 704/200, 704/226, 500; 714/52, 774
See application file for complete search history.

(56) References Cited

U.S. PATENT DOCUMENTS

| | | | | |
|---|---|---|---|---|
| 5,790,176 A | * | 8/1998 | Craig | .................. 725/115 |
| 5,847,771 A | * | 12/1998 | Cloutier et al. | ............. 348/564 |
| 6,154,499 A | * | 11/2000 | Bhaskar et al. | ............. 375/259 |
| 6,230,125 B1 | | 5/2001 | Vainio | |
| 6,526,531 B1 | * | 2/2003 | Wang | .......................... 714/704 |
| 6,578,162 B1 | * | 6/2003 | Yung | .......................... 714/708 |
| 6,681,203 B1 | * | 1/2004 | Seymour et al. | ............ 704/221 |
| 6,728,296 B1 | * | 4/2004 | Yung | .......................... 375/141 |

FOREIGN PATENT DOCUMENTS

DE    19932943    1/2001

OTHER PUBLICATIONS

PCT International Search Report dated Oct. 23, 2001.
3rd Generation Partnership Project Technical Specification, *Group Services and System Aspects; Mandatory Speech Codec speech processing functions AMR speech codec; Error concealment of lost frames*, 3G TS 26.091, version 3.1.0 (Dec. 1999), XP-002179452.

* cited by examiner

*Primary Examiner*—Daniel Abebe

(57) ABSTRACT

An apparatus and method for detecting and controlling audible errors in a sound communication system at the receiver utilizes channel quality data and also iterative synthesis. Errors occurring in synthesized speech are detected by searching for atypical sound with a stringency dependent upon channel quality. The greater the channel quality deficiency is, the higher the typicality standards will be. Errors are controlled by either re-synthesizing the signal in an iterative way using typicality standards which vary with channel quality deficiency, or by modifying the output signal using typicality standards which vary with channel quality deficiency, or both.

28 Claims, 3 Drawing Sheets

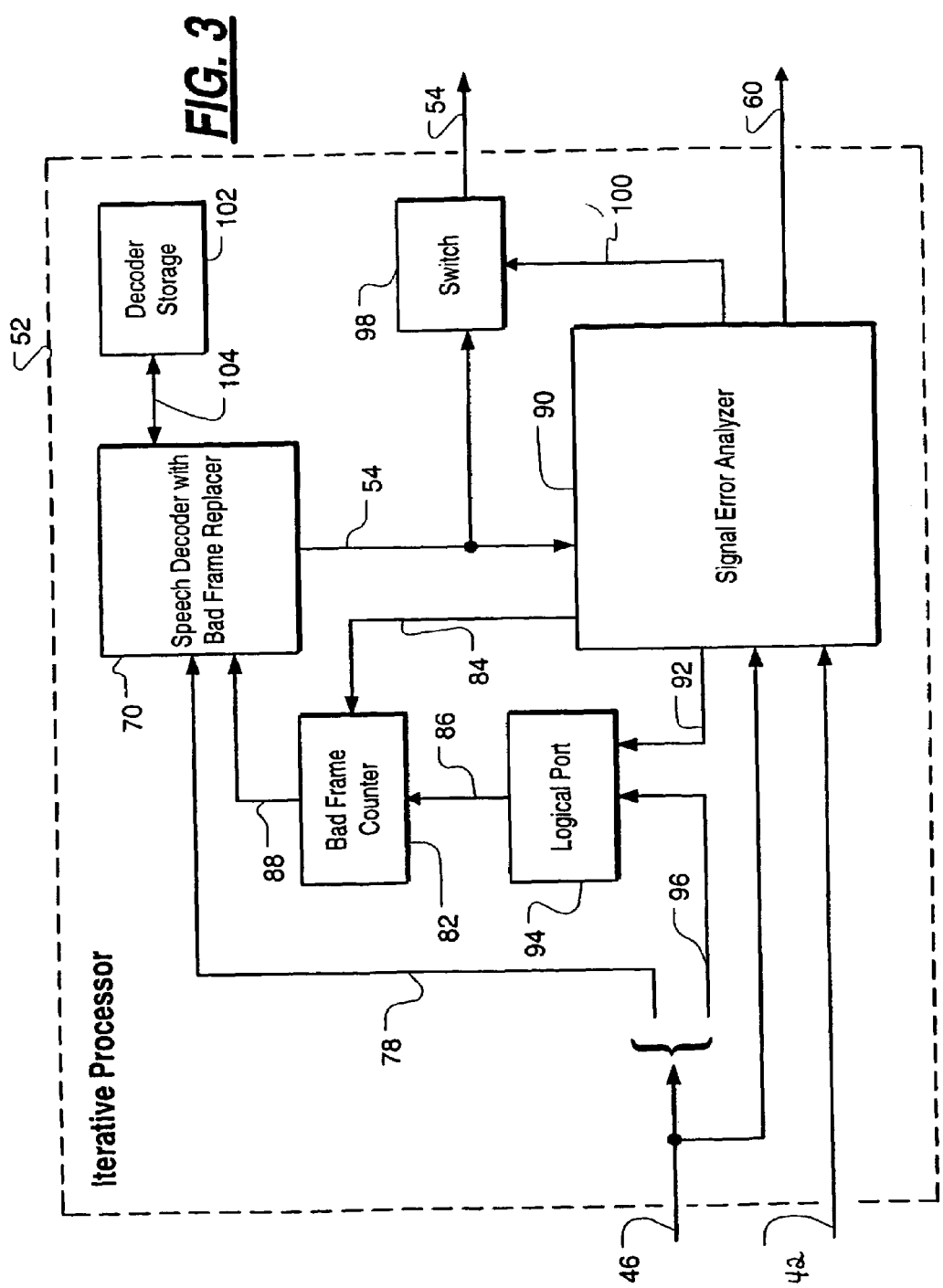

AUDIBLE ERROR DETECTOR AND CONTROLLER UTILIZING CHANNEL QUALITY DATA AND ITERATIVE SYNTHESIS

This application claims the benefit of U.S. provisional application No. 60/209,860, filed Jun. 7, 2000.

TECHNICAL FIELD OF THE INVENTION

This invention relates generally to the field of audible communication and more particularly to speech coding and channel coding.

BACKGROUND ART

In a sound communication system, an encoded signal is sent over a transmission channel to a receiver, where the incoming signal is used by a speech decoder to synthesize sound. Channel errors can adversely affect synthesized speech provided by the receiver, and there are several related art methods for concealing such channel errors.

The most common method of concealing channel errors is to use cyclic redundancy check (CRC) to detect the errors in the most important bits and then perform bad frame handling in the speech decoder. This usually means replacing the erroneous parameters with the previously received good ones, or with slightly modified versions of the previous good ones.

However, sometimes, this simple method of error detection and bad frame handling is not enough to prevent very audible errors from occurring. There are basically at least two reasons for this. The first reason is that the error detection code used in the CRC is often not 100% reliable, and therefore some erroneous frames are not marked as bad in the channel decoder; these frames, called Undetected Bad Frames (UBF), are then used in the normal speech synthesis in the speech decoder. This situation can produce very loud and audible artifacts in the synthesized speech. The second reason for the occurrence of audible errors is that, even after erroneous parameters have been replaced by previously received error-free parameters, the subsequent bad frame handling is sometimes unsuccessful and may produce audible artifacts.

One typical related art method for concealing channel errors, in the situations just described, is to analyze the synthesized speech for atypical speech frames and then conceal those previously undetected or unsuccessfully handled bad speech frames. This type of related art system for analyzing and correcting the synthesized speech often involves concealment units in combination with the channel decoder (including error detection) and bad frame handling, but the concealment units can also be implemented standalone (i.e. separately from the channel decoder and bad frame handling).

A major problem with related art algorithms for concealing errors in the synthesized speech is that those algorithms unintentionally conceal some error-free signals too, thus causing audible artifacts despite concealment measures. This is because of the rather non-stationary nature of a speech signal, which makes it rather difficult to separate erroneous parts of the synthesized speech. Another problem with the related art is that the concealment methods typically involve little more than signal attenuation, which merely reduces the volume of an erroneous sound fragment. A typical related art algorithm is as follows.

As shown in FIG. 1, an encoded signal on a line 12 is sent over a transmission channel to a receiver 10, where it is provided to a channel decoder 14 for processing. The channel decoder finds and corrects data bit errors, and then provides a channel-decoded signal on a line 16, including a speech parameter signal on a line 18 and a bad frame indicator signal on a line 20. The bad frame indication can be based on any of various different suggestive factors (CRC, channel SNR, signal level, et cetera). A speech decoder with bad frame replacer 22 is instructed by the incoming bad frame indicator signal to entirely or partially replace erroneous parameters with previous good parameters. Subsequently, the speech decoder with bad frame replacer 22 provides a synthesized signal 24 to a signal error analyzer 26 which analyzes the synthesized signal for erroneous sound characteristics atypical of human speech (the typicality standards are not correlated to the quality of the transmission channel). If the signal error analyzer does find atypical sound characteristics, it provides a modification command signal on a line 30 to a synthesized signal modifier 28 which responds to the modification command signal by either concealing errors in the synthesized signal on the line 24, or by allowing the synthesized signal on the line 24 to pass through unchanged if the signal error analyzer did not detect any significant errors. The synthesized signal modifier's concealment of audible errors is accomplished by lowering the signal gain (attenuation), and sometimes by additional actions, resulting in a synthesized output signal on a line 32.

As mentioned, a problem with related art algorithms is that they sometimes unintentionally detect and conceal error-free signals too, thus causing artifacts that audibly degrade the quality of the output speech signal. Thus, the related art involves a tradeoff between two contrary goals: avoiding changes to any error-free signals, while ensuring changes to all signal errors. Whenever the related art seeks to accomplish one of these goals, it does so at the expense of reaching the other goal.

Another problem with the related art algorithms is the ineffectiveness of their methods for concealing audible errors. For example, if a channel error would have caused a whistling sound, then the subsequent corrective modification may still provide an audible whistling sound, albeit at a lower and less disturbing volume.

DISCLOSURE OF THE INVENTION

The objective of the present invention is to improve the detection and concealment of audio errors occurring as a result of imperfect transmission channel quality. The invention deals more effectively with both of the major problems: audible errors caused by undetected bad frames, and audible errors caused by unsuccessful bad frame handling.

Accordingly, the present invention detects and analyzes atypical sound with a stringency dependent upon channel quality. The more deficient the channel quality is, the higher the typicality standards will be. This use of channel quality data is an advantage over related art, which does not correlate typicality standards to channel quality. The present invention deals with perfect channel quality by completely relaxing typicality standards, and thus the present invention will not attempt to repair error-free sound as happens in related art. Moreover, because the invention correlates stringency standards to channel quality, this invention becomes more inclined to take corrective action when channel quality is low. This invention thus avoids the very dramatic audible artifacts caused by mistakenly allowing bad frames through to the listener.

The present invention conceals errors by iteratively synthesizing the incoming signal and/or modifying the signal, in a way that depends upon channel quality. This is an advantage over related art, in which signal synthesis or modification is not correlated to standards dependent upon channel quality. In this invention, the worse the channel quality, the higher the standards to which the signal is subjected. In other words, the higher the channel quality deficiency, the higher the typicality standards. The present invention can be implemented, for example, at a mobile communication device, or at a base station in a wireless communication network, or at both.

In this invention, an iterative processor is able to provide synthesized signal meeting typicality standards which vary with channel quality deficiency. The iterative processor accomplishes this novel result by re-synthesizing the signal. However, when only one iteration is used (meaning that re-synthesis does not occur or is absent) then this invention still provides for modification of the synthesized signal in order to meet standards varying with channel quality deficiency, and this is again an advantage over related art wherein error detection standards and modification measures do not depend upon channel quality. Thus, according to the present invention, either an iterative synthesis process, or a subsequent signal modification process, is correlated to meet audio typicality standards which vary with channel quality deficiency, or alternatively both of these two processes are correlated to meet audio typicality standards which vary with channel quality deficiency. This invention substantially solves the problem of unintentionally concealing error-free signals, while effectively concealing signal errors.

BRIEF DESCRIPTION OF THE DRAWINGS

FIG. 3 is a diagrammatic representation of the iterative processor showing details not shown in FIG. 2.

BEST MODE FOR CARRYING OUT THE INVENTION

The present invention utilizes iterative synthesis of an encoded sound signal received over a transmission channel. The invention then provides an output sound signal having audibly improved accuracy as compared with conventional methods.

Figure 1:
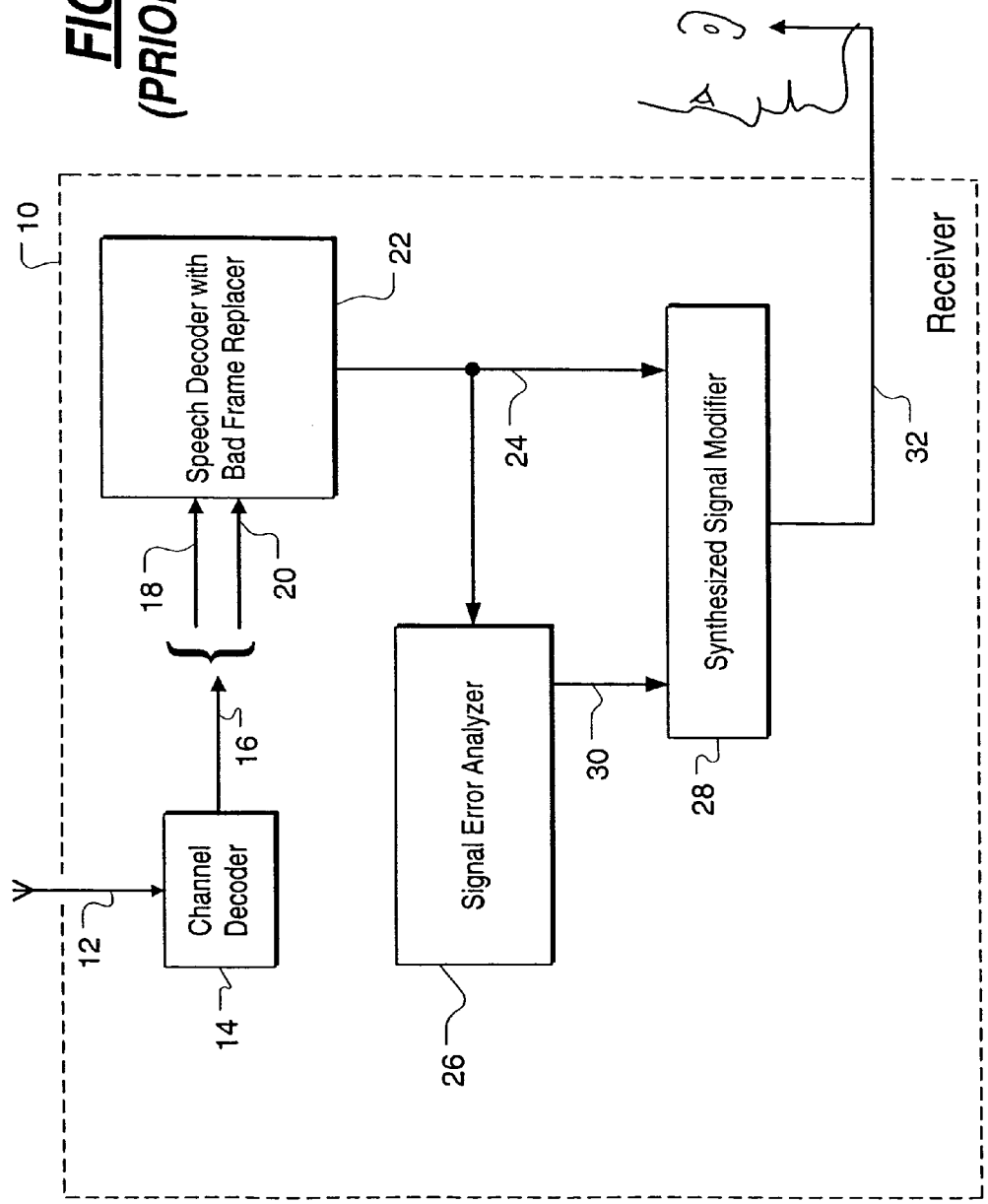
FIG. 1 is a diagrammatic representation of a typical related art algorithm for detecting and controlling audible error.
Figure 2:
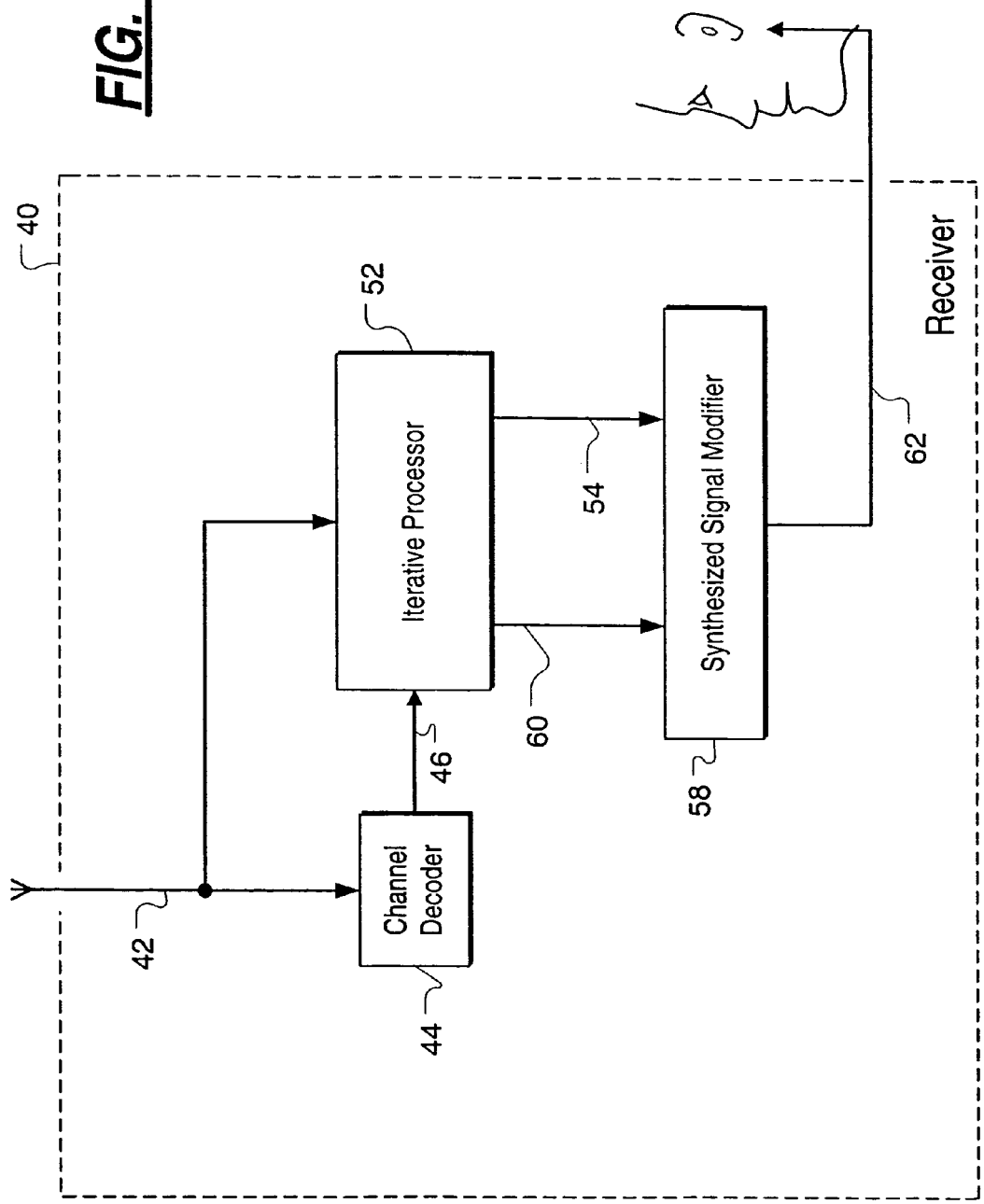
FIG. 2 is a diagrammatic representation of an embodiment of the present invention, for detecting and controlling audible error.

As shown in FIG. 2, a receiver device 40 receives an encoded signal on a line 42 received over a transmission channel, and ultimately produces a synthesized output signal on a line 62. This invention operates by, first of all, receiving the encoded signal on the line 42 over the transmission channel. That incoming signal is processed by a channel decoder 44 which finds and corrects data bit errors, and then provides a channel-decoded signal on a line 46 which contains standard data and may also contain further data including channel quality information. An iterative processor 52 is responsive to the channel-decoded signal 46 and also may be responsive to measurable channel quality information received directly from the transmission channel.

The iterative processor 52 provides a synthesized speech signal on a line 54 and may also provide a modification command signal on a line 60 to a synthesized signal modifier 58. The synthesized signal modifier 58 then modifies sound fragments of the synthesized signal to the extent instructed by the modification command signal on the line 60, and thus provides the synthesized output signal on the line 62. The synthesized output signal 62 may proceed directly from the receiver 40 to the user, or may involve further transmission and/or processing (possibly including another iterative synthesis) between the receiver 40 and the user shown in FIG. 2. A receiver 40 may, for example, be located at a base station in a wireless communication network, and/or located at a mobile communication device, and/or located at other network elements in a wireless communication network. Thus, a signal from a first mobile user that finally reaches a second mobile user may have been processed by more than one receiver of the type illustrated in FIG. 2; in that case, one iterative processor could be located at the base station which receives signals from the first mobile user, and another iterative processor could be located at the second mobile device, so the signal would be iteratively processed twice during its journey from the first mobile user to the second mobile user.

Preferred modification measures performed by the synthesized signal modifier 58 include the following measures to conceal atypical sounds: signal attenuation, spreading the signal spectrum, and attenuating the largest peaks in the synthesized signal spectrum. However, it should be recognized that no modification might be necessary due to the high performance of the iterative processor 52, combined with high channel quality.

The iterative processor 52 is not limited to synthesizing a single sound fragment just once, but rather can synthesize the signal iteratively until either a constant upper limit of iterations is reached or until the signal becomes typical for the type of sound at issue (e.g., speech). In other words, instead of merely replacing bad frames as instructed by the channel-decoded signal 46 and then performing a single synthesis, the constant number of iterations may be a value greater than one so that the iterative processor 52 also replaces bad frames identified as atypical by the iterative processor 52 itself. In each iteration, replacement of bad frames varies, so that each iteration will produce a slightly different synthesized speech signal. The replacing of bad frames can be varied between iterations by, for example, changing the attenuation factor of energy parameters, or by manipulating spectral parameters in order to flatten or sharpen the spectral peaks in the signal, or by using some of the parameters from a bad frame based upon an iteration-dependent comparison between the current number of parameters and the number of parameters from the original iteration.

The iteration is stopped when the speech signal apparently fulfills the typicality standards currently active, or when the iteration limit is reached. Only if the constant upper limit of iterations is reached will the synthesized signal modifier 58 perform a non-zero modification of the signal, as opposed to simply allowing the signal to pass through without modification by the synthesized signal modifier 58.

Each time a sound fragment is analyzed for typicality inside the iterative processor, the accuracy of that analysis is enhanced by the use of channel quality data. The channel quality data is vital for reliably responding to sound level errors, according to the present invention.

Channel quality information may enter the iterative processor 52 included in the channel-decoded signal on the line 46, for example as pseudo bit error rate (BER) calculated inside the channel decoder 44. Measurable channel quality information may also enter the invention's iterative processor 52 directly as non-decoded channel quality information contained in the encoded signal on the line 42 received over the transmission channel. The quality of the used transmission channel can be estimated by various different ways, in addition to BER (e.g. frame error rate, pseudo BER, signal to noise ratio, et cetera).

If there is no channel quality deficiency, then the error detection process is disabled, meaning that the iterative processor 52 relaxes its standards for typical sound to the point of nonexistence. This ensures, among other things, that the invention does not mistakenly alter synthesized signals that are actually error-free.

This invention is substantially based upon the principle that a single erroneous frame mistaken as a good frame can cause more damage to output speech quality than many mistakes in which a good frame is misinterpreted as a bad frame. Therefore, the more erroneous the incoming data (i.e., the lower the quality), the more inclined the receiver should be to interpret each single frame as erroneous. This is accomplished by the present invention, in which the iterative processor applies greater stringency for sound typicality when channel quality data shows lower channel quality.

As shown in FIG. 3, this invention includes a mechanism within the iterative processor 52 for accomplishing the purposes just described. Within the iterative processor 52, a speech decoder with bad frame replacer 70 responds to the channel decoded signal on the line 46 (which includes a speech parameter signal on the line 78), by replacing bad parameters with previously received good parameters. Then the speech decoder with bad frame replacer 70 synthesizes the signal, and provides this synthesized speech signal on a line 54 to the signal error analyzer 90 which examines the synthesized speech signal to see if there are fragments atypical for speech.

This examination for non-typicality, which occurs within the signal error analyzer, is correlated to the channel quality, with more stringent typicality standards corresponding to lower quality of service. As discussed above, the channel quality information is measurable from channel quality information contained in the encoded signal on the line 42 received over a transmission channel, and/or channel quality information is provided by the channel-decoded signal on the line 46 (e.g. pseudo BER). It is also possible for the signal error analyzer to be influenced by bad frame indication information and received speech-coding parameters (discussed below). In any case, the signal error analyzer 90 applies the typicality standards to the synthesized speech signal, and this can be done in several ways, including, for example, analyzing absolute and relative energy-level changes between successive speech frames.

According to a first embodiment of the present invention, if the signal error analyzer 90 finds atypical sound or speech fragments, then the speech decoder with bad frame replacer 70 further replaces bad frames with previously received good parameters, and re-synthesizes the signal. This iterative process repeats until the sound becomes typical or until an upper limit (N) of iterations is reached. Then the signal error analyzer 90 may provide a modification command signal on the line 60 which, as explained previously, is used outside the iterative processor 52 by the synthesized signal modifier 58 to determine whether and how to modify the synthesized speech signal on the line 54.

In a second embodiment of the present invention, the upper limit of iterations N is simply the number one (N=1), and re-synthesis does not occur or is absent. However, this is still a very different situation from the related art, because the signal error analyzer 90 sends a modification command signal on the line 60 to the synthesized signal modifier 58 requiring that the signal be modified depending upon the channel quality, wherein typicality standards vary with channel quality deficiency. In contrast signal modification in the related art does not use channel quality information in this way. Note that the first embodiment of the present invention, discussed above, may also employ signal modification which uses channel quality information in the same manner as the second embodiment, in which case the difference between the two embodiments is that re-synthesis cannot occur in the second embodiment.

In the first embodiment of this invention, the speech decoder with bad frame replacer 70 will replace frames that are determined to be atypical for speech by the signal error analyzer 26, instead of only replacing bad frames identified by the channel decoder 44, and this invention includes a detailed process for achieving this. Whenever a new set of parameters arrives via the speech parameter signal on the line 78, the speech decoder with bad frame replacer 70 immediately provides a state signal on a line 104 to a decoder storage 102 enabling the decoder storage 102 to preserve the internal states of the speech decoder with bad frame replacer 70 for use in succeeding iterations.

In the first iteration, the speech decoder with bad frame replacer 70 only uses parameters from the speech parameter signal on the line 78, if no bad frame is indicated by the channel decoder. If a bad frame is detected by the channel decoder, then, in the first iteration, parameters from the decoder storage 102 are usually used, or alternatively part of the parameters are taken from the line 78 and part are taken from the storage 102. In the following iterations, the speech decoder with bad frame replacer 70 uses parameters from the decoder storage 102, regardless of whether a bad frame was indicated by the channel decoder.

Before the speech decoder with bad frame replacer 70 begins each synthesis or re-synthesis within an iterative cycle, it receives a bad frame substitution signal on a line 88 instructing it whether or not to replace frames prior to synthesis. If replacement is not required, then the substitution signal on the line 88 indicates zero replacement; but if a replacement is required, then the substitution signal on the line 88 will indicate one replacement. This bad frame substitution signal on the line 88 comes from the bad frame counter 82, and the nature of this signal is determined by whether the bad frame counter 82 has a value of zero or a value of one.

The bad frame counter 82 is reset to zero immediately after each synthesis iteration in response to a reset signal on a line 84. The bad frame counter 82 will be put into value one if the channel decoder 44 indicated a bad frame and no synthesis has yet occurred. The bad frame counter 82 will also be put into value one if the channel decoder 44 indicated a good frame but the signal error analyzer 90 detected an atypical frame. Both of these situations produce the same result, in that they both force the bad frame counter 82 from value zero to value one. This count from zero to one happens in response to a count signal on a line 86 from a logical port 94. The logical port 94 performs a logical OR operation in response to two factors: whether the signal error analyzer 90 encountered an atypical frame and whether the channel decoder 44 detected a bad frame, and these factors are represented by a characteristics error signal on a line 92 from the signal error analyzer 90 and a bad frame indicator signal on the line 96 contained in the channel decoded signal on the line 46.

As mentioned previously, channel quality information may enter the iterative processor 52 included in the channel-decoded signal on the line 46, for example as pseudo BER, and may also enter the invention's iterative processor directly as channel quality information included in the encoded signal received over a transmission channel on the line 42. In both of these cases, the channel information would be input into the signal error analyzer 90 which interprets the channel quality information so as to establish stringency standards for typical speech (higher standards for lower channel quality).

The synthesized speech signal on the line 54 produced by the iterative processor 52 may enter the synthesized signal modifier 58 directly from the speech decoder with bad frame replacer 70, in which case the modification command signal on the line 60 instructs the synthesized signal modifier 58 to discard synthesized signals that are still in the process of iterative re-synthesis. However, this invention also includes a simple switch 98 to ensure that only a synthesized speech signal 54 that has been completely re-synthesized will enter the synthesized signal modifier 58. The operation of the switch is governed by a switch control signal on a line 100 from the signal error analyzer 90, so that the switch selects not to allow any signal to pass through unless the switch control signal indicates that the iteration is complete. Thus, due to the switch, the synthesized signal modifier 58 will usually pass the received signal through without taking any actions to modify it, because the iteration process will have usually produced a sound signal within typical range.

The present invention has numerous possible applications, and can be used at the receiver end of a digital wireless telecommunications system, in particular a wireless telephone system. In this application, the standards applied to sound signals will be commensurate with human speech.

It should be recognized that each signal described in this disclosure is defined broadly as a cause and effect relationship. The signal may be direct or indirect, may comprise any number of intermediate steps, and may be integrated together with other signals, as will be understood by those skilled in the art.

Although this invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. An apparatus comprising:
 a channel decoder (44), responsive to an encoded signal received over a transmission channel (42), for providing a channel decoded signal (46); and
 an iterative processor (52), responsive to the channel decoded signal (46), for providing a synthesized speech signal (54) meeting typicality standards which vary with channel quality deficiency.

2. The apparatus defined in claim 1, wherein the iterative processor (52) comprises:
 a speech decoder with bad frame replacer (70), responsive to the channel-decoded signal (46), for providing the synthesized speech signal (54); and
 a signal error analyzer (90), responsive to the synthesized speech signal (54) and responsive to the channel decoded signal (46), for providing a characteristics error signal (92) to which the speech decoder with bad frame replacer (70) is responsive, wherein the signal error analyzer (90) applies typicality standards which vary with channel quality deficiency.

3. The apparatus defined in claim 1, wherein the iterative processor (52) is also directly responsive to the encoded signal received over a transmission channel (42).

4. The apparatus defined in claim 1, wherein the apparatus is a mobile communication device.

5. The apparatus defined in claim 1, wherein the apparatus is a network element in a wireless communication network.

6. The apparatus defined in claim 5, wherein the network element is a base station.

7. An apparatus comprising:
 a channel decoder (44), responsive to an encoded signal received over a transmission channel (42), for providing a channel decoded signal (46); and
 an iterative processor (52), responsive to the channel decoded signal (46), for providing a synthesized speech signal (54) meeting typicality standards which vary with channel quality deficiency,
 wherein the iterative processor comprises:
 a speech decoder with bad frame replacer (70), responsive to a speech parameter signal (78) included in the channel-decoded signal (46), and responsive to a bad frame substitution signal (88), for providing the synthesized speech signal (54);
 a bad frame counter (82), responsive to a reset signal (84) and responsive to a count signal (86), for providing the bad frame substitution signal (88);
 a signal error analyzer (90), responsive to the channel-decoded signal (46) and responsive to the synthesized speech signal (54), for providing the reset signal, and for providing a characteristics error signal (92); and
 a logical port (94), responsive to the characteristics error signal (92) and also responsive to a bad frame indicator signal (96) included in the channel decoded signal (46), for providing the count signal (86).

8. The apparatus defined in claim 7, wherein the iterative processor (52) further comprises a switch (98), responsive to a switch control signal (100) from the signal error analyzer (90) and also responsive to the synthesized speech signal (54), for selectively providing the synthesized speech signal (54).

9. The apparatus defined in claim 7, wherein the iterative processor (52) further comprises a decoder storage (102), responsive to a state signal (104) from the speech decoder with bad frame replacer (70), for providing a state signal (104) back to the speech decoder with bad frame replacer (70).

10. An apparatus comprising:
 a channel decoder (44), responsive to an encoded signal received over a transmission channel (42), for providing a channel decoded signal (46);
 an iterative processor (52), responsive to the channel decoded signal (46), for providing a synthesized speech signal (54) and for providing a modification command signal (60); and
 a synthesized signal modifier (58), responsive to the synthesized speech signal (54) and to the modification command signal (60), for providing a synthesized output signal (62) meeting typicality standards which vary with channel quality deficiency.

11. The apparatus defined in claim 10, wherein the apparatus is a mobile communication device.

12. The apparatus defined in claim 10, wherein the apparatus is a network element in a wireless communication network.

13. The apparatus defined in claim 12, wherein the network element is a base station.

14. The apparatus defined in claim 10, wherein the iterative processor (52) performs only one iteration, without resynthesis.

15. The apparatus defined in claim 10, wherein the iterative processor (52) comprises:
   a speech decoder with bad frame replacer (70), responsive to the channel-decoded signal (46), for providing the synthesized speech signal (54); and
   a signal error analyzer (90), responsive to the synthesized speech signal (54) and responsive to the channel-decoded signal (46), for providing the modification command signal (60).

16. The apparatus defined in claim 15, wherein the iterative processor (52) performs only one iteration, without resynthesis.

17. The apparatus defined in claim 10, wherein the iterative processor (52) comprises:
   a speech decoder with bad frame replacer (70), responsive to a speech parameter signal (78) included in the channel-decoded signal (46), and responsive to a bad frame substitution signal (26), for providing the synthesized speech signal (54);
   a bad frame counter (82), responsive to a reset signal (84) and responsive to a count signal (86), for providing the bad frame substitution signal (88);
   a signal error analyzer (90), responsive to the channel-decoded signal (46) and responsive to the synthesized speech signal (54), for providing the modification command signal (60), for providing the reset signal (84), and for providing a characteristics error signal (92); and
   a logical port (94), responsive to the characteristics error signal (92) and also responsive to a bad frame indicator signal (96) included in the channel decoded signal (46), for providing the count signal (86).

18. The apparatus defined in claim 17, wherein the iterative processor (52) further comprises a switch (98), responsive to a switch control signal (100) from the signal error analyzer (90) and also responsive to the synthesized speech signal (54), for selectively providing the synthesized speech signal (54).

19. The apparatus defined in claim 17, wherein the iterative processor (52) further comprises a decoder storage (102), responsive to a state signal (104) from the speech decoder with bad frame replacer (70), for providing a state signal (104) back to the speech decoder with bad frame replacer (70).

20. The apparatus defined in claim 17, wherein the iterative processor (52) is also directly responsive to the encoded signal received over a transmission channel (42).

21. A method comprising the steps of:
   providing a channel-decoded signal (46) in response to an encoded signal received over a transmission channel (42); and
   executing an iterative signal processing step, in response to the channel-decoded signal (46), for providing a synthesized speech signal (54) meeting typicality requirements which vary with channel quality deficiency.

22. The method defined in claim 21, wherein the iterative signal processing step comprises the steps of:
   providing the synthesized speech signal (54) in response to the channel-decoded signal (46); and
   providing a characteristics error signal (92) responsive to the synthesized speech signal (54) and responsive to the channel decoded signal (46).

23. The method defined in claim 21, wherein the iterative processing step is also executed in direct response to the encoded signal received over a transmission channel (42).

24. A method comprising the steps of:
   providing a channel-decoded signal (46) in response to an encoded signal received over a transmission channel (42);
   executing an iterative signal processing step, in response to the channel-decoded signal (46), for providing a synthesized speech signal (54) and for providing a modification command signal (60); and
   providing a synthesized output signal (62) meeting typicality standards which vary with channel quality deficiency, in response to the synthesized speech signal (54) and also in response to the modification command signal (60).

25. The method defined in claim 24, wherein the iterative signal processing step is executed only once, without resynthesis.

26. The method defined in claim 24 wherein the iterative signal processing step comprises the steps of:
   providing the synthesized speech signal (54) in response to the channel-decoded signal (46); and
   providing the modification command signal (60) in response to the synthesized speech signal (54) and also in response to the channel decoded signal (46).

27. The method defined in claim 26, wherein the iterative signal processing step is executed only once, without resynthesis.

28. The method defined in claim 24, wherein the iterative processing step is also executed in direct response to the encoded signal received over a transmission channel (42).

* * * * *